US011658986B2

(12) United States Patent
Sharma et al.

(10) Patent No.: US 11,658,986 B2
(45) Date of Patent: May 23, 2023

(54) DETECTING ATTACKS ON COMPUTING DEVICES

(71) Applicant: HEWLETT PACKARD ENTERPRISE DEVELOPMENT LP, Houston, TX (US)

(72) Inventors: Puneet Sharma, Milpitas, CA (US); Anand Mudgerikar, Palo Alto, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/123,342

(22) Filed: Dec. 16, 2020

(65) Prior Publication Data

US 2021/0136092 A1 May 6, 2021

Related U.S. Application Data

(62) Division of application No. 15/885,447, filed on Jan. 31, 2018, now Pat. No. 10,897,470.

(51) Int. Cl.
*H04L 29/06* (2006.01)
*H04L 9/40* (2022.01)
*H04L 9/32* (2006.01)

(52) U.S. Cl.
CPC ........ *H04L 63/1416* (2013.01); *H04L 9/3236* (2013.01); *H04L 9/3242* (2013.01); *H04L 9/3297* (2013.01); *H04L 63/08* (2013.01); *H04L 63/14* (2013.01); *H04L 63/145* (2013.01)

(58) Field of Classification Search
None
See application file for complete search history.

(56) References Cited

U.S. PATENT DOCUMENTS 9,374,373 B1   6/2016  Chan et al.
9,654,485 B1 *  5/2017  Neumann ........... H04L 63/1416
(Continued)

FOREIGN PATENT DOCUMENTS

CN      106790149 A   5/2017
JP      2018-005818 A  1/2018
WO   WO-2017153983    9/2017

OTHER PUBLICATIONS

European Search Report and Search Opinion Received for EP Application No. 19153441.1, dated Jun. 18, 2019, 8 pages.
(Continued)

*Primary Examiner* — Andrew J Steinle
(74) *Attorney, Agent, or Firm* — Hewlett Packard Enterprise Patent Department

(57) ABSTRACT

An example system may comprise a first computing device comprising instructions executable by a hardware processor to: create, responsive to detecting a second computing device initially attempting to connect to a network, an unpopulated baseline profile for the second computing device; populate the baseline profile with initial processes running on the second computing device and initial system calls made by the initial processes during an initial operation time period of the second computing device; monitor, during a subsequent operation time period of the second computing device, subsequent processes running on the second computing device and subsequent system calls made by the subsequent processes; and detect an attack on the second computing device based on a comparison of the subsequent processes and the subsequent system calls to the populated baseline profile.

7 Claims, 5 Drawing Sheets

(56) References Cited

U.S. PATENT DOCUMENTS

| | | | |
|---|---|---|---|
| 2005/0132182 | A1 | 6/2005 | Challener et al. |
| 2016/0261465 | A1 | 9/2016 | Gupta et al. |
| 2016/0277435 | A1 | 9/2016 | Salajegheh et al. |
| 2017/0163666 | A1 | 6/2017 | Venkatramani et al. |
| 2017/0163733 | A1 | 6/2017 | Grefen et al. |
| 2017/0230410 | A1 | 8/2017 | Hassanzadeh et al. |
| 2017/0264629 | A1 | 9/2017 | Wei et al. |
| 2017/0302663 | A1* | 10/2017 | Nainar ................. H04W 12/12 |
| 2018/0004938 | A1* | 1/2018 | Schilling ............ G06F 9/45545 |
| 2018/0069947 | A1 | 3/2018 | Antipa et al. |

OTHER PUBLICATIONS

Agarwal, A. et al., "Poster Abstract: Detecting Abnormalities in IoT Program Executions through Control-Flow-Based Features," Apr. 18-21, 2017, IEEE, https://ieeexplore.ieee.org/abstract/document-7946916.

Baker, A. R. et al., Snort: IDS and IPS Toolkit, Syngress Jay Beale's Open Source Security Series, 2007, 31 pages.

Baker, L. B. et al., "Sony PlayStation Suffers Massive Data Breach," Reuters Technology News, Apr. 27, 2011, https://www.reuters.com/article/us-sony-stoldendata/sony-playstation-suffers-massive-data-breach-idUSTRE73P6WB20110426.

Dobbins, R., "Mirai IoT Botnet Description and DDoS Attack Mitigation," Oct. 26, 2016, https://www.netscout.com/blog/asert/mirai-iot-botnet-description-and-ddos-attack-mitigation.

Krontiris, I. et al., "LIDeA: A Distributed Lightweight Intrusion Detection Architecture for Sensor Networks," Sep. 22, 2008, http://ioanniskrontiris.de/publications/Lidea2008.pdf.

Muhlberg, J. T. et al., "Lightweight and Flexible Trust Agreement Modules for the Internet of Things," Jul. 1, 2015, https://link.springer.com/chapter/10.1007/978-3-319-24174-6_26.

Zhao, K. el al., "A Survey on the Internet of Things Security," 2013 Ninth Int'l Conference on Computational Intelligence and Security, IEEE, https://ieeexplore.ieee.org/abstract/document/6746513.

\* cited by examiner

DETECTING ATTACKS ON COMPUTING DEVICES

BACKGROUND

Computing devices are increasingly ubiquitous in homes, businesses, and various other environments. Computing devices can be connected to and communicate through a computer network. Computing devices may exchange data with other computing devices utilizing the computer network. The computing devices can be the target of a cyber-attacks. For example, a vulnerability of a computing device may be exploited to take over control of or otherwise after the operations of the computing device to achieve a malicious purpose. In an example, a cyber-attack may infect a computing device with a botnet and utilize the infected computing device to carry out a distributed denial-of-service attack on a target machine or resource to temporarily or indefinitely disrupt the services of a host connected to the Internet.

DETAILED DESCRIPTION

Figure 1:
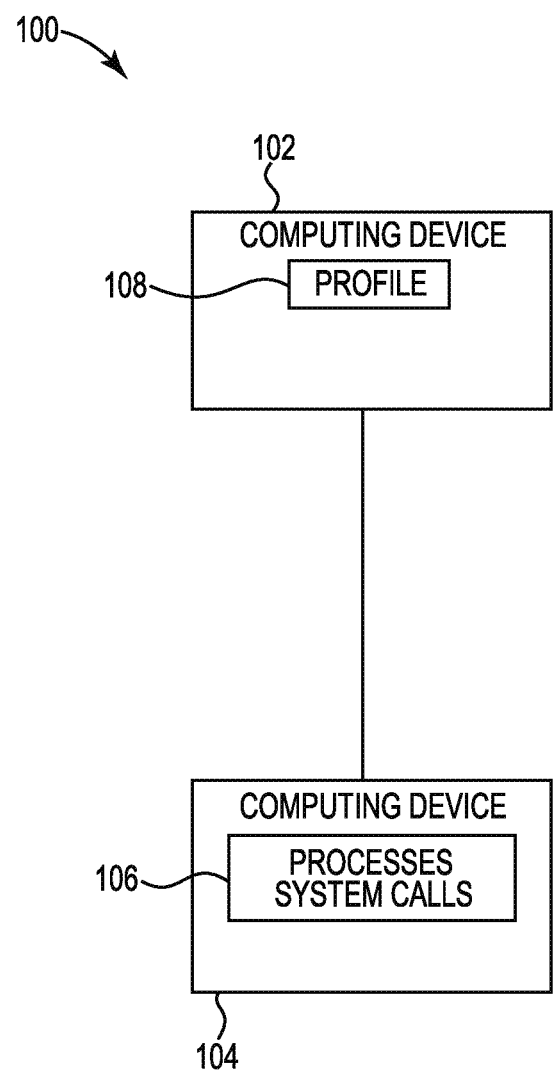
FIG. 1 illustrates an example of a system for process and system call attack detections consistent with the disclosure.

Computing devices are integrated into nearly every facet of modern life. Computing devices such as desktop computers, notebook computers, tablet computers, and smartphones are one example of computing devices that are ubiquitously utilized to process and communicate data. Such devices may be secured against and/or monitored for cyber-attacks by anti-virus and/or anti-malware applications. The anti-virus and/or anti-malware applications may be loaded on and/or executed by the computing devices. The anti-virus and/or anti-malware applications may utilize computing resources of the computing device in order to operate.

Another type of computing device may be an Internet of things (IoT) device. An IoT device may include a non-general-purpose computing device. That is, the IoT device may be a specific-purpose computing device. For example, the IoT device may include a device, home appliance, vehicle, implantable monitor, object, etc. that may include embedded electronics, a hardware processor, instructions executable by the hardware processor, sensors, actuators, and/or displays. Some examples of IoT devices may include smart speakers, smart thermostats, smart lightbulbs, smart locks, smart wall sockets, smart cameras, smart toys, smart remotes, smart kitchen appliances, smart watches, casting devices, smart light switches, biomedical monitors, etc. The IoT devices may include the components to achieve network connectivity with a computing network. As such, IoT device may connect the IoT devices with each other, other computing devices, servers, remote services, and/or other network appliances and allow for the exchange of data. By virtue of this connectivity, IoT devices may be exposed to cyber-attacks. And, while a hacker may not be interested in infecting, for example, a smart toaster in order to burn toast, the hacker may be interested in utilizing the smart toaster as a platform to launch further cyber-attacks on other resources in the network.

An IoT device may be incorporated with a relatively small amount of computational resources. Since IoT devices may have a fixed functionality and may not be designed with the computation hardware to perform the more computationally diverse and computationally intensive processes that computing devices such as desktop computers, notebook computers, tablet computers, and smartphones are able to perform. Rather, an IoT device may be designed such that it has computing resources concordant with accomplishing its fixed function in order to achieve a lowest cost and/or a highest reliability. As such, anti-virus and/or anti-malware applications that may be utilized with computing devices such as desktop computers, notebook computers, tablet computers, and smartphones may not be utilized with the constrained resources of the IoT device and/or may not be compatible with an operating system of a IoT device. IoT devices themselves may have weak to no security mechanisms in place to detect or foil cyber-attacks.

Some computing networks may utilize network intrusion prevention systems (IPS) and/or network intrusion detection system (IDS) to detect cyber-attacks. Such systems may employ network traffic-based techniques that may involve monitoring all of the traffic traversing a network and referencing stored known attack signatures to identify malicious or cyber-attack indicative network traffic. Such solutions may be computationally expensive and involve large amounts of network traffic access and storage space. Further, network traffic-based techniques may not be able to detect zero-day attacks or attacks not conforming to any stored attack signatures. Further, cyber-attacks originating from a host device and/or a side channel cyber-attack may not be detectable by the network traffic-based techniques. Further still, the network traffic-based techniques may generate an alert when an attack is detected but they may not provide information regarding whether the attack was successful or what resources on a computing device were compromised In contrast, examples of the present disclosure may utilize a system to create a baseline profile of initial processes running on a computing device and initial system calls made by the initial processes, monitor subsequent processes running on and system calls made by the subsequent processes on the computing device, and detect an attack on the computing device based on a comparison of the subsequent processes and system calls to the baseline profile. The examples of the present disclosure may detect intrusions aimed at computing devices such as IoT devices and prevent the compromise of these IoT devices. The examples of the present disclosure may detect zero-day cyber-attacks and cyber-attacks not conforming to known cyber-attack signatures. The examples of the present disclosure may detect cyber-attacks originating from the host and/or side channel attacks. The examples of the present disclosure may also provide additional information about detected cyber-attacks.

FIG. 1 illustrates an example of a system 100 for process and system call attack detections consistent with the disclosure. The system 100 is not limited to a particular example described herein and may include additional features such as those described in the non-transitory machine-readable storage medium 224 described in FIG. 2 and/or the method 340 described in FIG. 3.

The system 100 may include a first computing device 102. The computing device 102 may be connected to a computing network such as a local area network or wireless area network. The computing device 102 may include a network device. For example, the computing device 102 may include a network manager located on a centralized device such as a server. For example, the computing device 102 may include a server maintained on an edge system or gateway router of a computing network.

The computing device 102 may include non-transitory computer-readable medium. The computing device 102 may include instructions stored on the non-transitory computer-readable medium. The computing device 102 may include a hardware processor to execute the stored instructions to perform operations. The computing device 102 may communicate with, send signals to, receive signals from, and/or monitor the operations of a second computing device 104.

The system 100 may include a second computing device 104. The second computing device 104 may be an IoT device. The second computing device 104 may include non-transitory computer-readable medium. The second computing device 104 may include instructions stored on the non-transitory computer-readable medium. The second computing device 104 may include a hardware processor to execute the stored instructions to perform operations. In contrast to a general-purpose computing device, the second computing device 104 the function of the second computing device 104, as an IoT computing device, may not be solely to compute functions and run standalone instructions comprising a computer program. As an IoT device, the second computing device 104 may include non-transitory computer-readable medium, instructions stored on the non-transitory computer-readable medium, and/or processing hardware to support a function or specific-purpose of the IoT device separate from computation (e.g., operate as a smart appliance, operate in a building HVAC control system, capture images as a smart security camera, etc.). As such, the non-transitory computer-readable medium, instructions stored on the non-transitory computer-readable medium, and/or processing hardware may be tailored to a specific-purpose of the IoT second computing device 104. For example, the second computing device 104 may execute processes and system calls 106. System calls may include a programmatic request of a service from a kernel of an operating system executed on the second computing device 104. The system calls may result from the execution of the processes.

The second computing device 104 may attempt to connect to the computing network to which the first computing device 102 is connected. For example, the second computing device 104 may attempt to associate with an access point (AP) or otherwise establish a connection to the computing network.

As used herein, the term "access point (AP)", can, for example, refer to a networking device that allows a client device (e.g., second computing device 104) to connect to a wired or wireless network. An AP can include a processor, memory, and input/output interfaces, including wired network interfaces such as IEEE 802.3 Ethernet interfaces, as well as wireless network interfaces such as IEEE 802.11 WiFi interfaces, although examples of the disclosure are not limited to such interfaces. An AP can include memory, including read-write memory, and a hierarch of persistent memory such as ROM, EPROM, and Flash memory.

As used herein, AP generally refers to receiving points for any known or convenient wireless access technology which may later become known. Specifically, the term AP is not intended to be limited to IEEE 802.11-based APs. APs generally function as an electronic device that is adapted to allow wireless communication devices to connect to a wired network via various communication standards.

The first computing device 102 may monitor the computing network to identify other computing devices connected to or attempting to connect to the network. The first computing device 102 may detect the second computing device 104 initially attempting to connect to the computing network. An initial attempt to connect to a network may include a first attempt by the second device 104 to connect to the computing network following installation. In this manner, the second device 104 may be a new device attempting to establish a presence and be assigned an identifier on the network. In other examples, an initial attempt to connect to the computing network may include a first attempt to connect to the computing network following a firmware update to the second device 104.

Responsive to detecting the second computing device 104 initially attempting to connect to the computing network, the first computing device 102 may create a profile 108 for the second computing device 104. The profile 108 may initially be an unpopulated baseline profile that is associated with the second computing device 104. That is, the profile 100 may be an empty profile assigned to the second computing device 104.

Further, responsive to detecting the second computing device 104 initially attempting to connect to the computing network, the first computing device 102 may create a public/private key pair. The public/private key pair may be assigned to the unpopulated profile 108. The first computing device 102 may transmit an agent to the second computing device 104. An agent may include instructions that are stored on the second computing device 104 and are executable by a hardware processor of the second computing device 104.

Additionally, the first computing device 102 may transmit a cryptographic nonce to the second computing device 104. For example, the first computing device 102 may send an encrypted cryptographic nonce to the second computing device 104 for use in an authentication protocol for communication between the first computing device 102 and the second computing device 104.

In some examples, the agent may include instructions executable by the hardware processor of the second computing device 104 to generate log files at the second computing device 104. The log files may include a log of the processes and system calls 106 made by the operation of the second computing device 104. The agent may include instructions executable by the hardware processor of the second computing device 104 to utilize the transmitted cryptographic nonce in generating the log. In an example, the cryptographic nonce may be utilized by the second computing device 104 in order to encrypt or otherwise cryptographically secure the list of processes and system calls 106 in the log the file. The cryptographic nonce may be utilized by the second computing device 104 in order to signal to the first computing device 102 that any data (e.g., log files discussed below) transmitted form the second computing device 104 to the first computing device 102 are authentic and/or unaltered. In some examples, the cryptographic nonce may be utilized in a Merkle-Damgård hash function utilized by the first computing device 102 and the second computing device 104.

In an example, the second computing device 104 may log initial processes running on the second computing device 104 and initial system calls made by the initial processes during an initial operation time period of the second computing device 104. The initial operation time period may include a time period at and/or immediately following the installation of the second computing device 104 on the computing network and/or immediately following the installation of the agent on the second computing device 104. During this initial operation time period, the second computing device 104 may be designated as operating normally and to not be infected by a cyber-attack by virtue of its nascent connection to the network. As such, the processes and system calls 106 logged during this initial operation time period may be designated as normal and/or non-infected baseline processes and system calls 106 indicative of the normal baseline operation of the second computing device 104.

The second computing device 104 may transmit the log file of the initial processes running on the second computing device 104 and initial system calls made by the initial processes during an initial operation time period to the first computing device 102. The first computing device 102 may utilize the public/private key pair assigned to the profile 108 of the second computing device 104 to authenticate the communication between the second computing device 104 and the first computing device 102.

The first computing device 102 may populate the profile 108 with the initial processes running on the second computing device 104 and initial system calls made by the initial processes during the initial operation time period of the second computing device 104. The first computing device 102 may populate the profile 108 from the log received from the second computing device 104. The first computing device 102 may populate the profile 108 responsive to authenticating the log and/or its contents. The profile 108 may then be utilized as a baseline reference of processes and system calls 106 that occur at the second device during a normal, non-cyberattacked, non-infected operation of the second computing device 104. From establishment of the profile 108, the processes and system calls 106 may serve as the benchmark of what normal, non-cyberattacked, non-infected operation of the second computing device 104 will look like from a processes and system calls perspective. The profile 108 may be saved at the first computing device 102 in the form of a file or files with administrative read/write access restrictions.

Following population of the profile 108, the first computing device 102 and/or the second computing device 104 may monitor subsequent processes running on the second computing device 104 and subsequent system calls made by the subsequent processes during a subsequent operation time period of the second computing device 104. The subsequent operation time period may include a period of time subsequent to the installation of the second computing device 104 to the computing network for a first time, subsequent to the installation of the agent on the second computing device 104, subsequent to the transmission of the initial processes and system calls, and/or subsequent to the population of the profile 108. Monitoring the second computing device 104 during the subsequent operation time period may not include a specialized set of operations that alter the processes and system calls 106 occurring at second computing device 104, but rather may include monitoring and/or logging the processes and system calls 106 already occurring at the second computing device 104.

In an example, monitoring the subsequent processes and system calls may include a continuing logging of the subsequent processes and system calls at the second computing device 104. The second computing device 104 may log subsequent processes and subsequent system calls utilizing the cryptographic nonce and/or an updated cryptographic nonce sent from the first computing device 102 to the second computing device 104 to encrypt the contents and/or to signal the contents are authentic. The second computing device 104 may periodically transmit to the first computing device 102 a most recently created log file including the subsequent processes running on the second computing device 104 and subsequent system calls made by the subsequent processes during a subsequent operation time period of the second computing device 104. That is, the first computing device 102 may periodically receive a log file from the second computing device 104 containing the processes and system calls 106 that have occurred at the second computing device 104 over a portion of the period of time since the last log file was transmitted to and/or received by the first computing device 102. In this manner, the first computing device 102 may continue to receive, on a periodic basis, log files from the second computing device 104 during the entire operation of the second computing device 104 subsequent to its installation to the computing network.

The first computing device 102 may authenticate each log file and/or its contents that it receives form the second computing device 104. The first computing device 102 may utilize the cryptographic nonce transmitted to the profile 108 to authenticate the log files and/or their contents. The first computing device 102 may utilize an updated cryptographic nonce transmitted to the profile 108 to authenticate the log files and/or their contents after a first authentication utilizing the previous cryptographic nonce. The first computing device 102 may update a previous cryptographic nonce based on a received log file and may transmit the updated cryptographic nonce to the second computing device 104 for use in preparing subsequent log files.

The first computing device 102 may compare the authenticated subsequent processes and the subsequent system calls received in the log file to the populated profile 108. Comparing the subsequent processes and the subsequent system calls received in the log file to the populated profile 108 may include a match comparison between the subsequent processes and the subsequent system calls received in the log file to the populated profile 108 and the initial processes and initial system calls stored in the profile 108. Subsequent processes and/or subsequent system calls that do not match and/or fall below a threshold amount of matching to a portion of the initial processes and/or initial system calls stored in the profile 108 may be flagged as anomalous.

In some examples, comparing the subsequent processes and the subsequent system calls received in the log file to the populated profile 108 may include identifying a duration of the subsequent processes and/or the subsequent system calls received in the log file. If the identified duration of the subsequent processes and/or the subsequent system calls received in the log file do not match and/or fall below a threshold amount of matching to a duration of a portion of the initial processes and/or initial system calls stored in the profile 108, then they may be flagged as anomalous.

Further, statistical analysis of the relationship between the subsequent processes and/or the subsequent system calls, or characteristic thereof, and the initial processes and/or initial system calls, or characteristic thereof, stored in the profile 108 may be conducted to detect anomalies. Additionally, machine learning models and/or techniques may be utilized to detect anomalies. For example, the first computing device 102 may utilize computational learning and pattern recognition to learn from and predict anomalous process and system calls made by the processes. Furthermore, when an anomaly is detected, the source processes may be identified along with the anomaly in order to provide further identifying details of a potential cyber-attack.

The first computing device 102 may, based on such comparisons between the subsequent processes and/or the subsequent system calls, or characteristic thereof, and the initial processes and/or initial system calls, or characteristic thereof, stored in the profile 108, detect a cyber-attack on the second computing device 104. For example, if the comparison yields incongruities between the subsequent processes and/or the subsequent system calls and the initial processes and/or initial system calls the direct computing device 102 may determine that the second computing device 104 has been the victim of a cyber-attack.

Once a cyber-attack has been detected various remedial measures may be triggered. For example, the second computing device 104 may be turned off, reset, and/or disconnected from the network. A report may be issued to a system administrator that the second computing device 104 is suspected of having been cyber-attacked. Anti-virus and/or firmware remediation may be triggered. These various remedial measures and others may be conducted by the first computing device 102 and/or may be conducted by other computing devices in response to an indication from the first computing device 102 that the second computing device 104 is suspected of having been cyber-attacked.

The first computing device 102 may also detect that an attack on the second computing device 104 has occurred without basing the detection on the comparison of the subsequent processes and the subsequent system calls to the initial processes and the initial system calls stored in the profile 108. For example, the first computing device 102 may detect that the log file received from the second computing device 104 has failed an authentication attempt by the first computing device 102. The first computing device 102 may detect that the log file is tampered with then the log file fails authentication. Such tampering may indicate that a hacker has attempted to alter the contents of the log file in order to spoof the initial processes and the initial system calls stored in the profile 108 and give the system 100 the impression that the second computing device 104 is operating normally and has not been cyber-attacked. However, the hacker was not able to accurately recreate the authentication mechanisms utilized by the first computing device 102 and the second computing device 104. As such, a failure to authenticate a log file received from a second computing device 104 may result in a first computing device 102 determining that the second computing device 104 has been cyber-attacked.

The detection of an attack by the first computing device 102 may result in an alert and/or indication of the attack being made by the first computing device 102 to initiate remedial measures. The alert and/or indication may identify the second computing device 104, report the details of the anomaly that led to the detection, report a determination of whether the attack was successful, report a severity of an attack, report a range of an attack, report a list of the suspected resources on the second computing device 104 compromised in the attack, and/or report a list of suspected other network resources that may be compromised by the attack.

The system 100 may accomplish the above described examples without access to computing network traffic incurring overhead on the computing network. Additionally, the system 100 does not utilize attack signatures that quickly fall out of date, involve frequent updating, and incur substantial storage and/or computational overhead on the computing network. Further, attack signature-based evasion techniques may not be useful against the system 100. Furthermore, even when the second computing device 104 has been cyber-attacked and is compromised, the ability to detect an attack with the authentication of log files maintains the integrity of the system 100.

Figure 2:
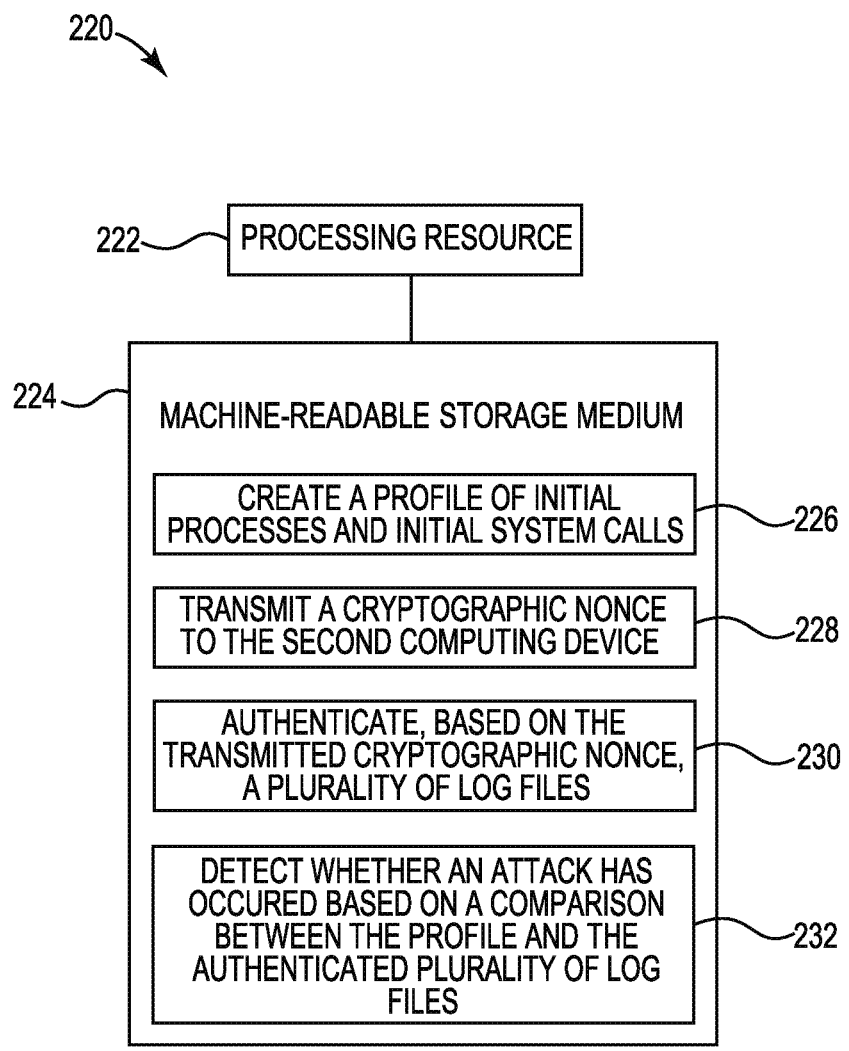
FIG. 2 illustrates a diagram of an example of a processing resource and a non-transitory machine-readable medium for process and system call attack detections consistent with the disclosure.

FIG. 2 illustrates a diagram 220 of an example of a processing resource 222 and a non-transitory machine readable medium 224 for process and system call attack detections consistent with the disclosure. A memory resource, such as the non-transitory machine-readable medium 224, may be used to store instructions (e.g., 226, 228, 230, 232) executed by the processing resource 222 to perform the operations as described herein. The operations are not limited to a particular example described herein and may include additional operations such as those described in the system 100 described in FIG. 1 and the method 340 described in FIG. 3.

A processing resource 222 may execute the instructions stored on the non-transitory machine readable medium 224. The non-transitory machine-readable medium 224 may be any type of volatile or non-volatile memory or storage, such as random access memory (RAM), flash memory, read-only memory (ROM), storage volumes, a hard disk, or a combination thereof.

The machine-readable medium 224 may store instructions 226 executable by the processing resource 222 to create, at a first computing device on a network, a profile. The profile may be created in response to detecting a second computing device attempting to connect to the network for a first time or for a first time following an update. The period of time following the attempt to connect to the network may be the initialization stage of the second computing device. During the initialization stage the second computing device may establish a connection with the network and begin its operations. The created profile may initially be an empty profile assigned to the second computing device.

The instructions 226 may be executable by the processing resource 222 to install, in response to detecting the second computing device attempting to connect to the network, an agent on the second computing device. The agent may include instructions executable by a processing resource of the second computing device to track and log initial processes of a second computing device and initial system calls made by the initial processes of the second computing device during the initialization stage of the second computing device to the network. The initial processes and initial system calls may be saved as log files.

The tracking and/or logging of the initial processes and the initial system calls may occur for a particular period of time. For example, the tracking and/or logging of the initial processes and the initial system calls may occur for a period of time immediately following the second computing device establishing a connection to the computing network. The period of time may be a period of time that the second computing device is performing a complete cycle of operations associated with its function. For example, the second computing device may be an IoT device utilizing a sensor to sense a stimulus and then adjust a feature of a building management system. A complete cycle of operations may include the sensor sensing the stimulus and the second computing device sending a signal to adjust the feature of the building management system. That is, the period of time may correspond to a period of time to build a definition of how a non-cyber-attacked second computing device operates from the perspective of the processes and system calls. The second computing device may send, to the first computing device, the log file containing the log of the initial processes of a second computing device and initial system calls made by the initial processes of the second computing device.

The instructions 226 may be executable by the processing resource 222 to populate, at the first computing device, the profile from the received log file. Populating the profile may include saving the initial processes of a second computing device and initial system calls made by the initial processes of the second computing device from the log file into the profile. The profile may be utilized as a reference profile of initial processes of the second computing device and initial system calls made by the initial processes of the second computing device. The profile may be supplemented with data from a manufacturer of the second computing device. For example, the profile may be supplemented with manufacturer specifications of the second computing device including expected and/or baseline operating characteristics of the second computing device as defined by the manufacturer. In an example, the profile may be supplemented with manufacturer specifications of expected and/or baseline processes of the second computing device and expected and/or baseline system calls made by the processes.

The machine-readable medium 224 may store instructions 228 executable by the processing resource 222 to transmit a cryptographic nonce to the second computing device. The cryptographic nonce may itself be encrypted. The cryptographic nonce may be utilized as an initialization vector for creating a first hash chain valued stored with a first log file of a plurality of log files. Each of the plurality of log files, created at the second computing device, may include a corresponding portion of subsequent processes of the second computing device and subsequent system calls made by the subsequent processes of the second computing device.

The second computing device may utilize the cryptographic nonce to generate hash chains of the portion of subsequent processes of the second computing device and subsequent system calls made by the subsequent processes of the second computing device. A timer may be applied to a window for the second computing device to utilize the cryptographic nonce to generate the hash chains. For example, the second computing device may be allotted five minutes to utilize the cryptographic nonce to generate the hash chains for a log file before the process is labeled anomalous by the first computing device.

A new hash chain link (generate hash chain value) may be added at a regular interval. For example, a hash chain link may be added every ten seconds following the reception of the cryptographic nonce by the second computing device. The cryptographic nonce may be deleted immediately following the creation if the first hash chain link.

In order for a hacker to be able to manipulate the log files to prevent anomalous processes and service calls from showing up in the log files reported to the first computing device, the hacker would need to know the cryptographic nonce. In order to learn the cryptographic nonce and evade detect the hacker would need to successfully cyber-attack and compromise the second computing device and modify the logs all within the first interval. In the above described example, the hacker would have to successfully cyber-attack and compromise the second computing device and manipulate the log files in the first ten second interval in order to have access to the cryptographic nonce. Timing and executing such an attack within this narrow timeframe may be statistically improbable.

After the first interval of the regular intervals has passed and the cryptographic nonce is deleted, the second link of the hash chain may be generated by the second computing device utilizing the hash of the previous hash chain value and a hash of the current files being logged. This process of successively building new hash chain links utilizing the previous values and hashes of the current log files can be repeated at the regular interval until the window is closed. The final hash chain along with the plurality of log files may be sent to the first computing device.

In an example where the window for the second computing device to utilize the cryptographic nonce to generate the hash chains for a log file is five minutes and a hash chain link is added at ten second intervals, the generated hash chain may have thirty hash chain links. However, the window and interval are both variables that may be modified to suit various computing devices, deployments, and/or attack risks.

A new cryptographic nonce may be periodically created and transmitted to the second computing device. For example, once a first window is closed and/or the final hash chain for the first window along with the plurality of log files is sent to the first computing device, a new cryptographic nonce may be created by the first computing device and transmitted to the second computing device in a first interval of a next window restarting the process for the next window of processes and system calls being logged.

The machine-readable medium 224 may store instructions 230 executable by the processing resource 222 to authenticate the plurality of log files received from the second computing device. The plurality of log files may be authenticated utilizing the cryptographic nonce transmitted from the first computing device to the second computing device. In order to be successfully authenticated, each of the plurality of log files may be analyzed to confirm that they contain the hash chain that corresponds to and/or incorporates the cryptographic nonce sent to the second computing device during the first interval of the window.

Authenticating may include detecting whether an attack on the second computing device has occurred based on whether the authentication of the plurality of log files was successful. If the authentication was successful, then the second computing device may be determined to not have been cyber-attacked and/or the log files may be determined to be genuine and/or untampered with. Although a determination may subsequently be made that the second computing device has been cyber-attacked on the basis of anomalous processes and/or systems calls contained within the log files, a successful authentication may result in a determination that the second computing device has not been compromised by a cyber-attack that is attempting to alter the log of the processes and/or system calls.

The machine-readable medium 224 may store instructions 232 executable by the processing resource 222 to detect whether an attack on the second computing device has occurred based on a comparison between the profile and the authenticated plurality of log files. The comparison may include a comparison of a sequence, duration, and/or identity of processes and system calls in an authenticated log file to a sequence, duration, and/or identity of initial processes of a second computing device and initial system calls made by the initial processes of the second computing device during an initialization stage of the second computing device to the network. If the comparison yields inconsistencies between the two, it may be determined that the second computing device has been cyber-attacked. Additionally, a severity of a detected cyber-attack may be determined based on the comparison. When a cyber-attack is detected, the anomalous processes and/or system calls, the identity of the second computing device, and/or the severity of the attack may be reported for remedial measures.

Figure 3:
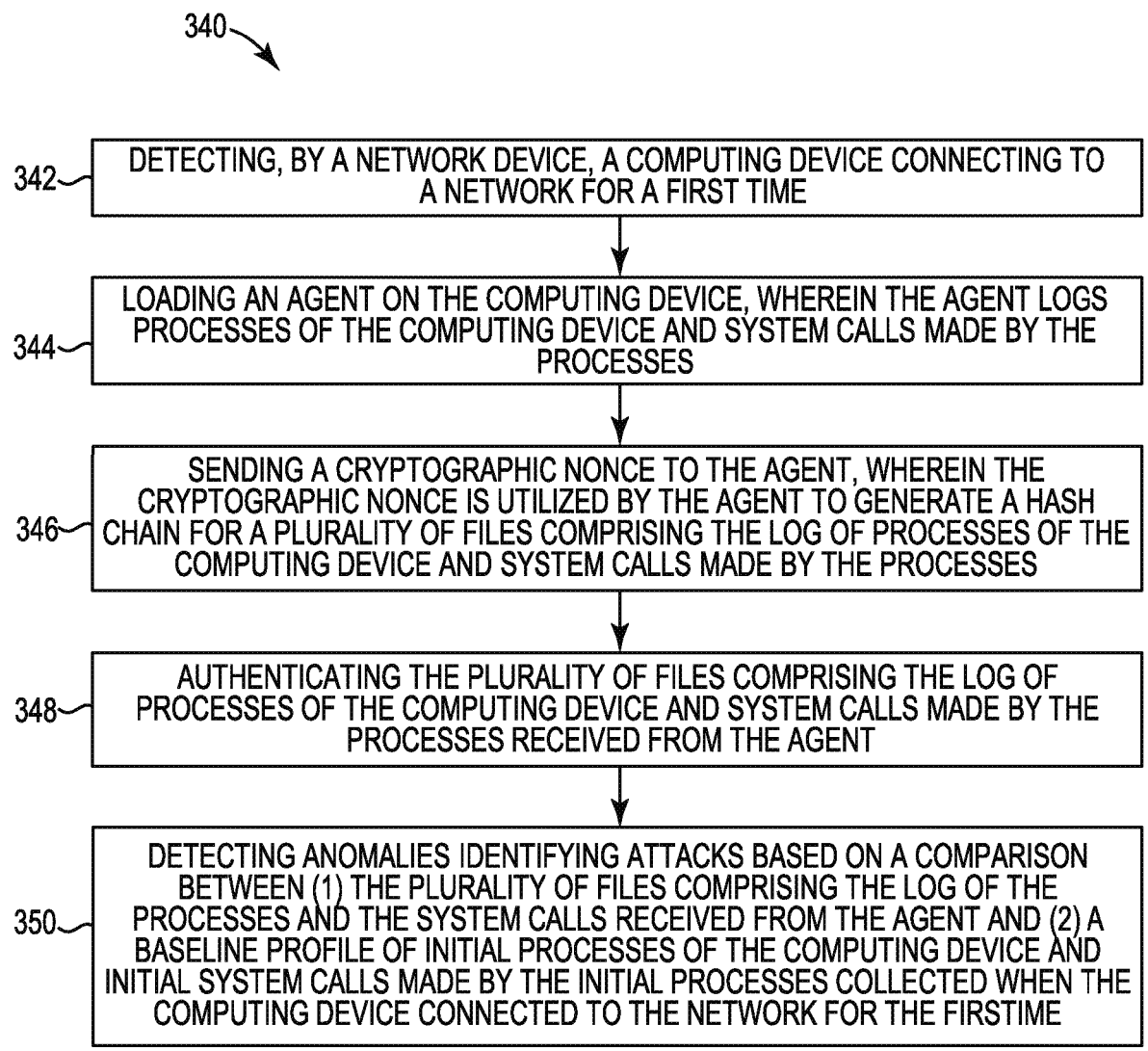
FIG. 3 illustrates a flow diagram of an example of a method for process and system call attack detections consistent with the disclosure.

FIG. 3 illustrates a flow diagram of an example of a method 340 for process and system call attack detections consistent with the disclosure. The method 340 is not limited to a particular example described herein and may include additional features such as those described in the system 100 described in FIG. 1 and the non-transitory machine-readable storage medium described in FIG. 2.

At 342, the method 340 may include detecting, by a network device, a computing device connecting to a network for a first time. The computing device may be an IoT computing device.

The network device may include an edge device. As used herein, the term "edge device," may, for example, refer to a device providing an entry point to a computing network. Examples of an edge device may include a router, routing switches, integrated access devices, multiplexers, and a variety of access devices. An edge device may also provide a connection into a carrier and/or service provider network.

At 344, the method 340 may include loading an agent on the computing device. The agent may be stored on the memory of the computing device and may utilize the processing resource of the computing device. The agent may log the processes of the computing device and system calls made by the processes. Logging the processes of the computing device and the system calls made by the processes may include saving the computing device and the system calls in a log file to be transmitted to the network device.

At 346, the method 340 may include sending a cryptographic nonce to the agent. The cryptographic nonce may be utilized by the agent to generate a hash chain for a plurality of files comprising the log of processes of the computing device and system calls made by the processes. For example, a Merkle-Damgård hash function may be utilized to generate the hash chain for the plurality of files comprising the log of processes of the computing device and system calls made by the processes A window of time for the agent to generate the hash chain may be defined. Additionally, an interval of time during the window of time may be defined within which the agent may generate a new chain in the hash chain. After the window of time has expired, a new cryptographic nonce may be sent to the agent restarting hash chain generation for another log file under the new cryptographic nonce.

For each window, the final hash chain and all the iterations of the log file may be transmitted to the network device. For example, a secure socket layer (SSL) security protocol stream may be established between the network device and the computing device. The plurality of files comprising the log of processes of the computing device and system calls made by the processes in addition to the hash chain may be transferred to the network device from the computing device utilizing the SSL stream.

At 348, the method 340 may include authenticating the plurality of files received from the computing device. The plurality of files may include the log of processes of the computing device and system calls made by the processes. Authenticating the plurality of files may include determining whether the hash chain values of each of the plurality of files correspond to a corresponding nonce sent to the computing device in a first interval of a window during which they were logged. If each of the plurality of files are successfully authenticated, then the processes and system calls in the log files may be determined to be genuine and/or untampered with. If, however, a file fails authentication, then the processes and system calls in the log files may be determined to be altered and may not be used for further comparisons with initial processes and system calls. Instead, the computing device may be determined to have been compromised by a cyber-attack.

At 350, the method 340 may include detecting anomalies that identify cyber-attacks. The anomalies may be differences between the plurality of files comprising the log of the processes and the system calls received from the agent and a baseline profile of initial processes of the computing device and initial system calls made by the initial processes collected when the computing device connected to the network for the first time. For example, if the log of the processes and the system calls received from the agent are different from the initial processes and the initial system calls, this may be an indication that the computing device has been compromised and/or diverted from its normal operations by a cyber-attack.

Once a cyber-attack has been detected, an indication of the attack may be generated by the network device. Remedial measures may be instigated in response to the indication of the attack. For example, the computing device may be turned off, removed from the network, and/or flagged as infected to an administrator.

Figure 4:
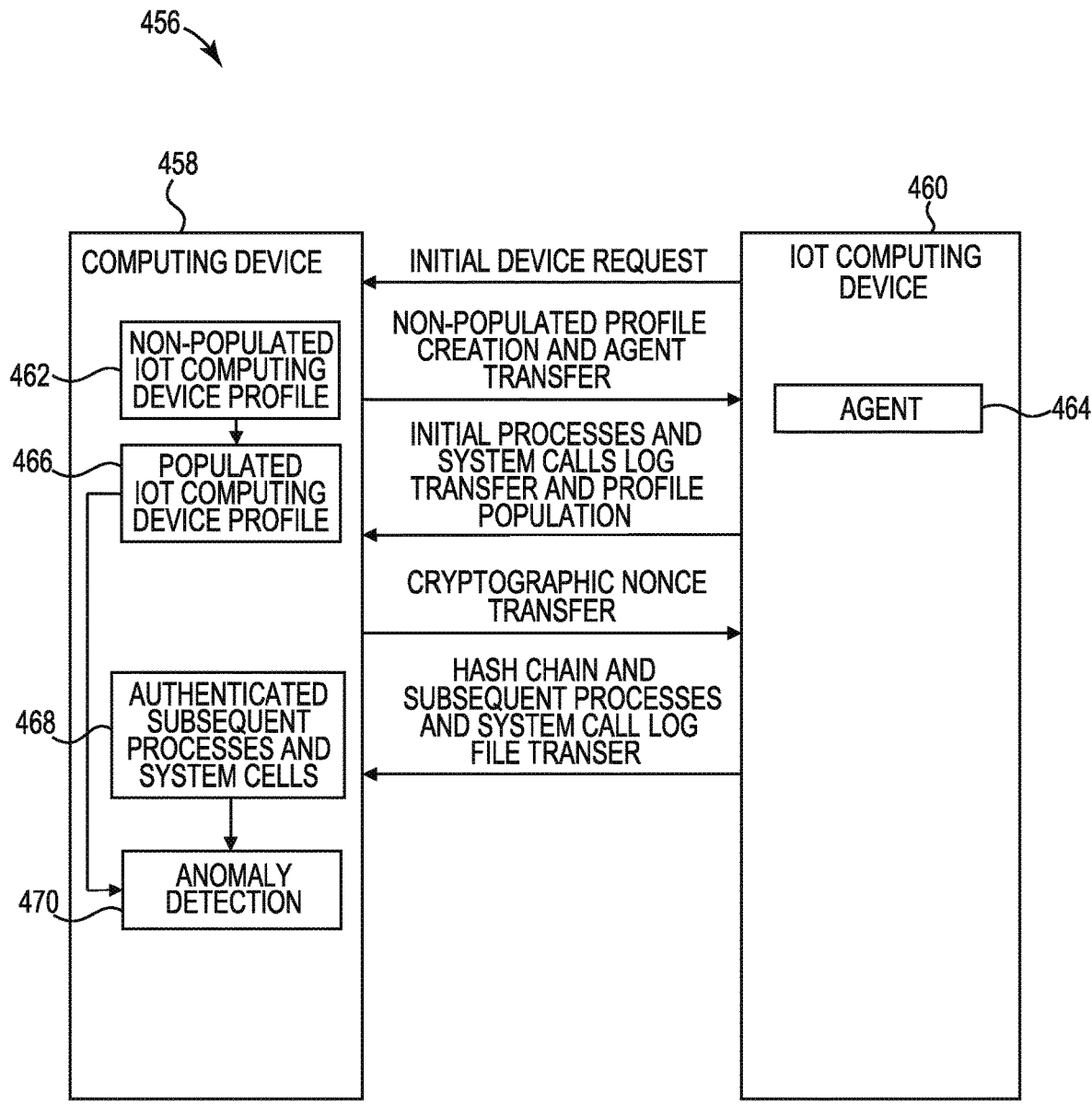
FIG. 4 illustrates an operation sequence diagram of an example of a system for process and system call attack detections consistent with the disclosure.

FIG. 4 illustrates an operation sequence diagram of an example of a system 456 for process and system call attack detections consistent with the disclosure. The system 456 may include a computing device 458 and an IoT computing device 460. The IoT computing device 460 may generate an initial device request. The initial device request may include a request to connect to a network that the computing device 458 is connected to. The initial device request may be transmitted to and/or received by the computing device 458.

In response to detecting the initial device request, the computing device 458 may create a non-populated IoT computing device profile 462 assigned to the IoT computing device 460. In addition to creating the non-populated IoT computing device profile 462, the computing device 458 may transfer an agent 464 to be installed on the IoT computing device 460. The IoT computing device 460 may install the agent 464.

The agent 464 may cause the IoT computing device 460 to log initial processes at the IoT computing device 460 and system calls made by those initial processes. The agent 464 may transfer the logged initial processes and system calls to the computing device 458 to populate the non-populated IoT computing device profile 462.

The computing device 458 may receive the initial processes and system calls from the IoT computing device 460. The computing device 458 may generate a populated IoT computing device profile 466 by populating the non-populated IoT computing device profile 462 with the received initial processes and system calls.

The computing device 458 may transfer a cryptographic nonce to the IoT computing device 460. The agent 464 may cause the IoT computing device 460 to utilize the cryptographic nonce as an initialization vector to create a hash chain for subsequent logged processes and system calls. As such, the agent 464 may cause the IoT computing device 460 to continue to log the subsequent processes and system calls and create a hash chain of the log files. The agent 464 may cause the IoT computing device 460 to transfer the hash chain and the subsequent processes and system call log files to the computing device 458.

The computing device 458 may authenticate the hash chain and the list of subsequent processes and system call log files received from the IoT computing device 460. If the hash chain and the subsequent processes and system call log files fail authentication, the computing device 458 may determine that the IoT computing device 460 has been cyber-attacked and/or is otherwise compromised or malfunctioning and may report the same to trigger remedial action.

If the subsequent processes and system call log foes are authenticated, then the authenticated subsequent processes and system calls 468 may be utilized for anomaly detection 470. Anomaly detection 470 may include comparing the authenticated subsequent processes and system calls 468 to the initial processes and system calls stored in the populated IoT computing device profile 466. The anomaly detection 470 may utilize direct comparison, statistical analysis, machine learning, etc. to identify an anomalous subsequent processes and/or system call. If such an anomaly is detected, the computing device 458 may determine that the IoT computing device 460 has been cyber-attacked and/or is otherwise compromised or malfunctioning and may report the same to trigger remedial action.

Figure 5:
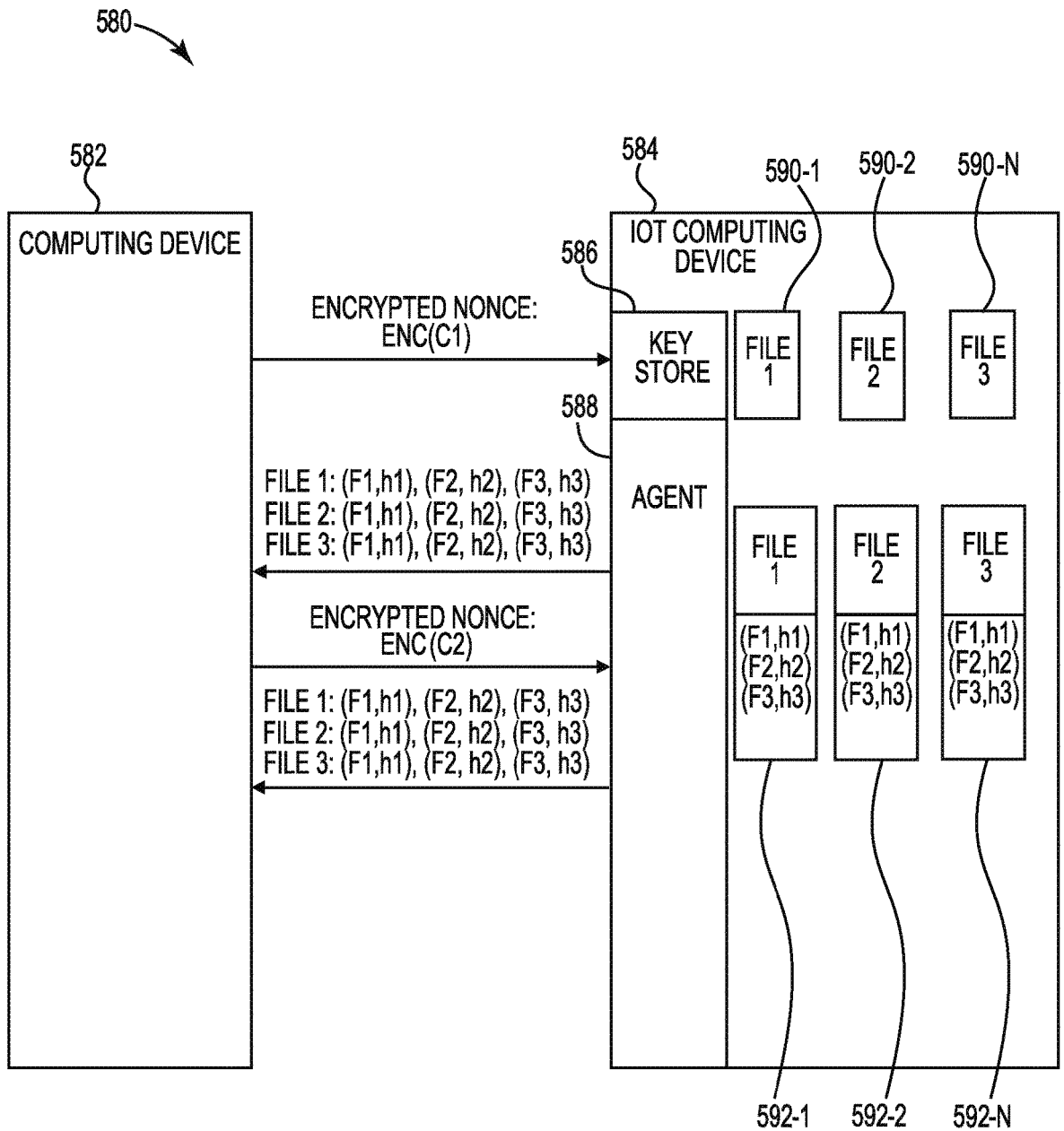
FIG. 5 illustrates an operation sequence diagram of an example of an encryption system for process and system call attack detections consistent with the disclosure.

FIG. 5 illustrates an operation sequence diagram of an example of an encryption system 580 for process and system call attack detections consistent with the disclosure. The encryption system 580 may include a computing device 582 and an IoT computing device 584. The computing device 582 may send an encrypted nonce Enc(c1) to the IoT computing device 584. The IoT computing device 584 may store the encrypted nonce in a key store 586 at the IoT computing device 584.

The IoT computing device 584 may log the processes of the IoT computing device 584 and the system calls associated with those processes. The IoT computing device 584 may save the logged processes and system calls as log files 590-1, 590-2, and 590-N.

The IoT computing device 584 may utilize the encrypted nonce Enc(c1) as an initialization vector to create hash chains 592-1, 592-2, ... 592-N comprising linked hashes for each of the log files 590-1, 590-2, ... 590-N. A window (e.g., time between the transfer of encrypted nonce Enc(c1) and the transfer of encrypted nonce Enc (c2)) may be allotted for the agent 588 to cause the IoT computing device 584 to generate hash chains 592-1 ... 592-N of the processes and system calls. A new hash link may be added at an interval within the window forming the hash chain over the duration of the window. The encrypted nonce Enc(c1) may be deleted from the key store 586 as soon as the first hash is created. The hash value and the file may be stored at the IoT computing device 584.

Once the window has closed, the IoT computing device 584 may send the final hash chain 592-1 ... 592-N along with all the iterations of the file to the computing device 582 for authentication. The computing device 582 may authenticate the files by verifying the hash values for each iteration of the file match an expected value.

If the verification is successful, the computing device 582 may assume that the files have not been tampered with. The computing device 582 may, after the window closes, issue an updated encrypted nonce Enc(c2) to the IoT computing device 584. The updated encrypted nonce Enc(c2) may be stored in the key store 586 and utilized as an initialization vector to create new hash chains comprising linked hashes for each of a set of new log files logged since the close of the last window. The sequence of operations involving the encrypted nonce Enc(c1) may be repeated with the updated encrypted nonce Enc(c2) and the new log files.

Conversely, if authentication fails the computing device 582 may assume that the files have been tampered with and that the IoT computing device 584 is compromised. As a result, the computing device 582 may discontinue communication of nonces to the IoT computing device 584.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure, and should not be taken in a limiting sense.

What is claimed:

1. A system comprising:
   a first computing device comprising instructions executable by a hardware processor to:
   transmit, responsive to detecting a second computing device initially attempting to connect to the network for a first time, an agent to the second computing device to generate log files of initial processes running on the second computing device during an initial operation time period of the second computing device, initial system calls made by the initial processes during the initial operation time period, subsequent processes running on the second computing device during a subsequent operation time period of the second computing device, and subsequent system calls made by the subsequent processes during the subsequent operation time period, wherein the initial system calls comprise initial programmatic requests of services from a kernel of an operating system executing on the second computing device, and the subsequent system calls comprise subsequent programmatic requests of services from the kernel;
   create, responsive to detecting the second computing device initially attempting to connect to the network, an unpopulated baseline profile for the second computing device;
   populate the baseline profile with the initial processes and the initial system calls;
   monitor, during the subsequent operation time period, the subsequent processes and the subsequent system calls; and
   detect an attack on the second computing device based on a comparison of the subsequent processes and the subsequent system calls to the populated baseline profile.

2. The system of claim 1, wherein the instructions executable to detect the attack include instructions executable to detect the attack by identifying the subsequent processes and the subsequent system calls do not match a portion of the initial processes and the initial system calls.

3. The system of claim 1, wherein the instructions executable to detect the attack include instructions executable to detect the attack by identifying a duration of the subsequent processes and the subsequent system calls do not match a duration of a portion of the initial processes and the initial system calls.

4. The system of claim 1, wherein the instructions executable to monitor the subsequent processes and the subsequent system calls include instructions to monitor the subsequent processes and the subsequent system calls from a log file periodically received from the second computing device.

5. The system of claim 4, including the instructions executable to assign a public-private key pair to the unpopulated baseline profile.

6. The system of claim 5, including the instructions executable to detect that the log file is tampered with when the log file fails authentication.

7. A system comprising:
   a first computing device comprising instructions executable by a hardware processor to:
      create, responsive to detecting a second computing device initially attempting to connect to a network, an unpopulated baseline profile for the second computing device;
      populate the baseline profile with initial processes running on the second computing device and initial system calls made by the initial processes during an initial operation time period of the second computing device, wherein the initial system calls comprise initial programmatic requests of services from a kernel of an operating system executing on the second computing device;
   monitor, during a subsequent operation time period of the second computing device, subsequent processes running on the second computing device and subsequent system calls made by the subsequent processes, wherein the subsequent system calls comprise subsequent programmatic requests of services from the kernel of the operating system executing on the second computing device; and
   detect an attack on the second computing device based on a comparison of the subsequent processes and the subsequent system calls to the populated baseline profile, wherein detection of the attack comprises identifying a duration of the subsequent processes and the subsequent system calls do not match a duration of a portion of the initial processes and the initial system calls.

\* \* \* \* \*